United States Patent [19]

Bagnulo

[11] 3,977,956
[45] Aug. 31, 1976

[54] CORROSION-PREVENTION SYSTEM
[75] Inventor: Luigi Bagnulo, Milan, Italy
[73] Assignee: Caunned Aktiengesellschaft, Vaduz, Liechtenstein
[22] Filed: Apr. 28, 1975
[21] Appl. No.: 571,994

[30] Foreign Application Priority Data
May 7, 1974 Switzerland.......................... 6205/74

[52] U.S. Cl................................ 204/196; 204/147
[51] Int. Cl.² ........................................ C23F 13/00
[58] Field of Search ............ 204/147, 148, 196, 197

[56] References Cited
UNITED STATES PATENTS

| | | | |
|---|---|---|---|
| 883,170 | 3/1908 | Christy................................ | 204/268 |
| 909,831 | 1/1909 | Strecker-Aufermann .......... | 204/268 |
| 1,842,541 | 1/1932 | Cumberland ...................... | 204/196 |
| 3,408,280 | 10/1968 | Preiser............................... | 204/196 |
| 3,461,051 | 8/1969 | Vrable............................... | 204/147 |
| 3,477,930 | 11/1969 | Crites................................. | 204/197 |

FOREIGN PATENTS OR APPLICATIONS

| | | | |
|---|---|---|---|
| 980,690 | 1/1965 | United Kingdom................. | 204/196 |

Primary Examiner—T. Tung
Attorney, Agent, or Firm—Michael J. Striker

[57] ABSTRACT

The corrosion-prevention system comprises a metallic conduit having an exterior surface subjected to the corrosive effects of a surrounding ambient wetted environment, and an interior surface subjected to the corrosive effects of fluids conveyed within the conduit. First cathodic protection means completes a first electrolytic path with the corrosively-wetted environment serving as the electrolyte, thereby cathodically protecting the exterior surface. Second cathodic protection means protects the interior surface and includes a plurality of inert anodes electrically connected to cathodic plate means which are located exteriorly of the conduit so as to intercept the flow of current in said first electrolytic path and conduct the current to the inert anodes and complete a second electrolytic path through the corrosive fluids conveyed within said conduit.

7 Claims, 3 Drawing Figures

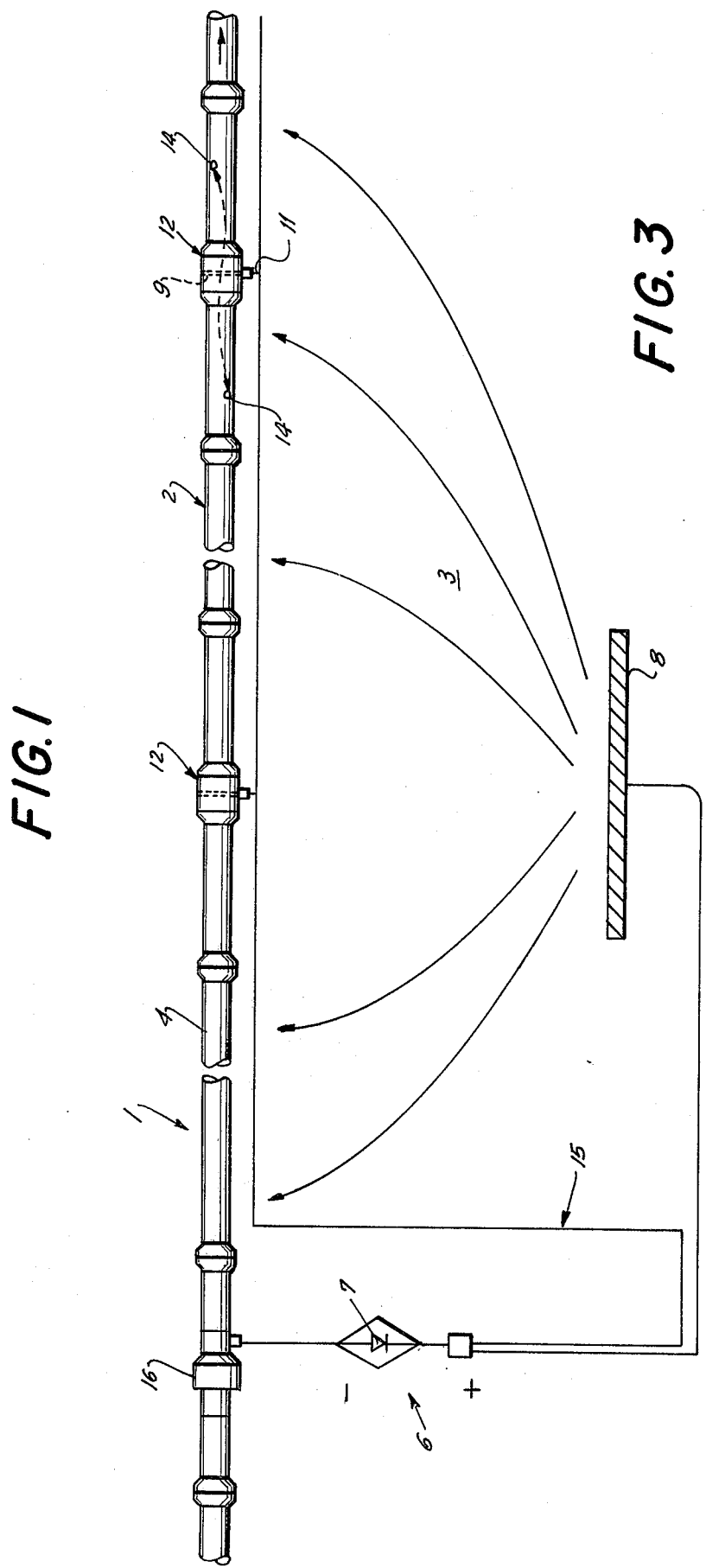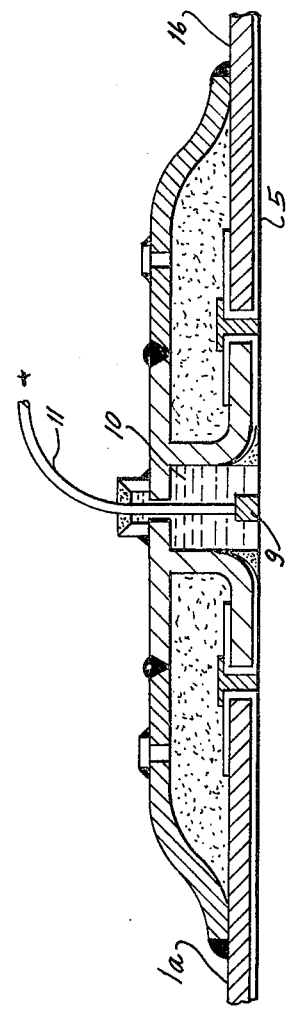

CORROSION-PREVENTION SYSTEM

BACKGROUND OF THE INVENTION

The present invention relates to a corrosion-prevention system, and more particularly to a metallic piping system having exterior and interior surfaces which are subjected to the effects of spontaneous corrosion.

Spontaneous corrosion on metallic pipes is a well-recognized problem in the prior art. Metallic inhomogeneities and temperature gradients along the pipe are among several contributing factors which cause one metallic region of the pipe to serve as an anode and another metallic region of the pipe to serve as a cathode. In the presence of liquid, an electrolytic action will ensue. The anodic metallic region will tend to react or "waste" away, thus causing the pipe to corrode and to be destroyed.

One prior art approach has attempted to solve this problem by employing sacrificial anodes. Briefly stated, the sacrificial anode is electrically connected to the metallic pipe surface to be protected and is made of a metal material which is higher in the electromotive series (e.g. zinc, aluminum, magnesium, or alloys of these materials) than the metal material (e.g. iron or other ferrous materials) to be protected. Hence, the sacrificial anode will react or dissolve into the electrolytic medium before the metallic material to be protected.

This approach has the obvious disadvantage that the sacrificial anodes need to be constantly replaced with fresh material. Thus, maintenance of the system is expensive and burdensome.

A further approach is to coat a layer of an anti-corrosion substance on a metallic pipe surface to be protected. This approach has the disadvantage that it is very difficult to apply a continuous coating over the entire length of the pipe, especially on its interior surfaces. Undesired scratches inevitably occur as a result of poor application, handling, etc. Alternatively, the metallic portions are commonly exposed due to the coating being melted as a result of the heat caused by welding two adjacent metallic pipe sections together. In either case, this passive protection fails to protect such exposed portions, and corrosion quickly follows.

Another approach is to use an impressed current system. An inert anode, i.e. one which will not waste or dissolve into the electrolyte medium, is mounted in close proximity to the metallic surface to be protected. A positive source of direct current is electrically connected with the inert anode, and a protective electric field is thereby set up which opposes the electrical field caused by the chemico-physical variations of the pipe.

This approach suffers the drawback that each inert anode must be individually connected to a source of positive current. In other words, in applications where the piping extends over great distances, electrical cable must be supplied over this extended distance. Moreover, the electrical connections must be made at each individual inert anode. This operation is both costly in terms of labor and material.

SUMMARY OF THE INVENTION

Accordingly, it is the general object of the present invention to overcome the disadvantages of the prior art.

More particularly, it is an object of the present invention to simultaneously protect the interior and exterior surfaces of a metallic conduit from the effects of spontaneous corrosion.

Another object is to eliminate the need for extending electrical cable over long distances and for providing for fixed electrical connections with the inert anodes.

A further object is to provide an improved corrosion-prevention system which is both simple in operation and economical in maintenance.

In keeping with these objects and others which will become apparent hereinafter, one feature is to provide first means for cathodically protecting the exterior surface of a metallic conduit which is in contact with a surrounding corrosively-wet environment. This first means completes a first electrolytic path with the environment serving as the electrolyte.

A further feature is to provide second means for cathodically protecting the interior surface of the metallic conduit which is in contact with the corrosive fluids conveyed within the conduit. The second means includes a plurality of inert anodes which are mounted at interior locations spaced along the elongation of the conduit, and it is further provided with cathodic plate means which are located exteriorly of the conduit. The cathodic plate means intercepts the first electrolytic path and supplies electrical current to the inert anodes by electrical means. Thus, the second means completes a second electrolytic path with the corrosive fluids within the conduit serving as the electrolyte.

It is evident that the corrosion-prevention system described above overcomes the prior art drawback of requiring extended electrical cables to be supplied over long distances. Furthermore, electrical connections between the electrical cable and each individual inert anode need no longer be provided.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a diagrammatic view of an apparatus according to the prior art;

FIG. 3 is a sectioned view showing a detail of the arrangement.

DESCRIPTION OF THE PREFERRED EMBODIMENT

Figure 2:
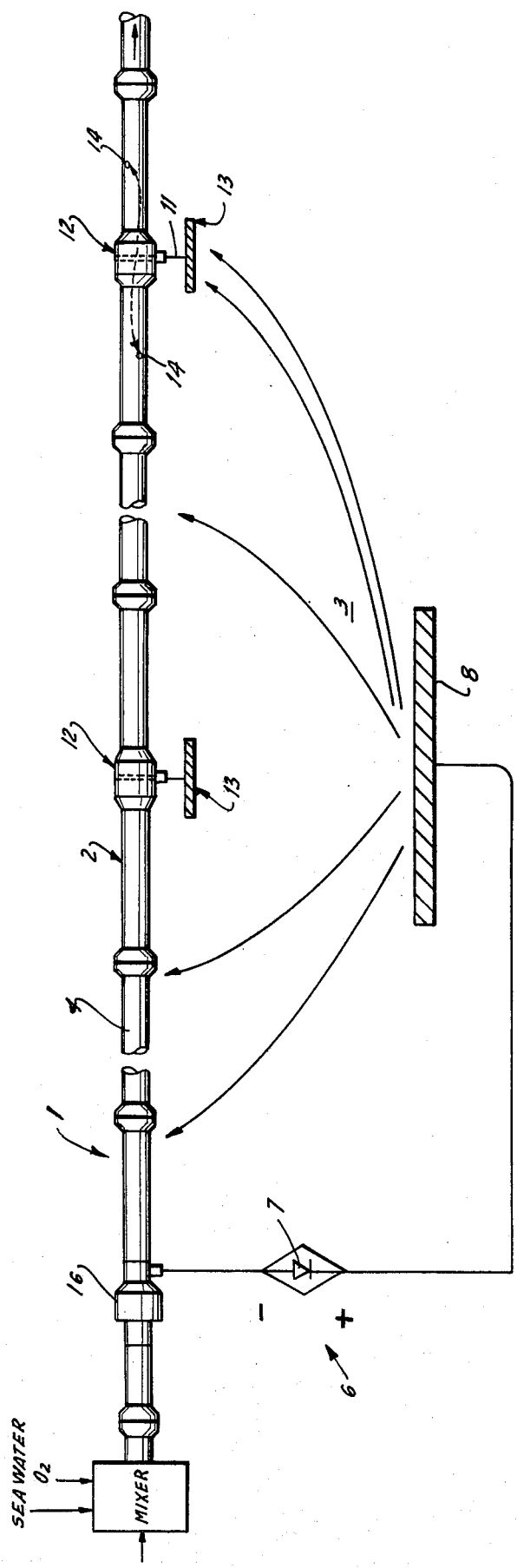
FIG. 2 is a diagrammatic view of an apparatus according to the present invention.

Referring to the apparatus which has been illustrated in FIGS. 1 through 3, it will be seen that reference numeral 1 identifies an elongated metallic conduit having an exterior surface 2 and an interior surface 4. The exterior surface 2 is in direct contact with and surrounded by a corrosively-wet environment 3. The environment 3 may be air or soil containing water moisture, or sea water itself. The interior surface 4 is in direct contact with corrosive fluids, such as sewage water or the like, and bounds a passage within said conduit 1 for corrosive fluids therethrough.

The conduit 1 is comprised of a plurality of metallic piping sections 1a, 1b, each fixedly secured with each other at the abutting joints 12. Such a conduit is disclosed in my U.S. Pat. No. 3,843,170, issued Oct. 22, 1974, the entire disclosure of which is hereby incorporated by reference.

The interior surface 4 of the conduit 1 is provided with a corrosion-resistant coating or layer 5 (diagrammatically shown in FIG. 3) which provides for some measure of passive protection due to the fact that undesired scratches or exposed matallic portions 14 are present.

First means for cathodically protecting the exterior surface 2 of the conduit 1 comprises a source of direct current 6 having a positive (+) and a negative (−) terminal. The direct current source can be a battery, or a source of alternating current rectified by a diode-rectifier unit 7, the latter case being schematically shown in FIGS. 1 and 2.

Transmitter means 8 is formed of metal material, such as iron, cast iron, carbon, graphite, iron-silicium, or preferably of inert metallic anodic material, such as platinum-coated titanium.

Transmitter means 8 is electrically connected to the positive terminal, and is physically located at a distance spaced from the exterior surface 2 to be protected. The negative terminal of the source 6 is electrically connected to the exterior surface 2 and, thus, a first electrolytic path is completed with the corrosively-wet environment 3 serving as the electrolyte.

It will be appreciated that the magnitude of the electric current flow flowing from the transmitter plate means 8 towards the exterior surface 2 depends, of course, upon the size of the transmitter plate means 8, the physical position of the plate 8 relative to the conduit 1, the amount of electrolyte contained in the environment, and the magnitude of the direct current actually being supplied.

Second means for cathodically protecting the interior surface 4 of the conduit 1 comprises at least one, and preferably a plurality of, inert or non-reactive anodes 9 mounted at interior locations of the conduit and spaced lengthwise along its elongation.

As more clearly shown in the detail of FIG. 3, the inert anode 9 is surrounded by electrically-insulating means 10 and is electrically connected by means of the electrically-insulated wire 11 to a positive terminal of the source 6 of direct current (non-illustrated in FIG. 3).

The electrical cable 15 shown in FIG. 1 is intended to illustrate the prior art drawback of having to separately supply the cable 15 along the elongation of the conduit 1 for extended distances. At each location of the anode 9, the cable 15 must be separately electrically connected.

To overcome this drawback, FIG. 2 illustrates a plurality of cathodic plate means 13. The cathodic plate means 13 are mounted on, and located exteriorly of, the conduit 1. Each of the cathode plate means 13 intercepts the above-mentioned first electrolytic path (through 3) and is electrically connected by means of the connector or low-loss wire 11 with respective ones of the inert anodes 9 so as to complete a second electrolyte path through the corrosive fluids being conveyed within the interior surface 4 of the conduit 1.

In this second electrolyte path, the inert anode 9 serves as the anode, the interior surface 4 serves as the cathode, and the conveyed corrosive fluids serve as the electrolyte. If the coating 5 is provided on the interior surface 4, then the second electrolyte path is completed through the exposed metallic portions 14 and, in turn, to the exterior surface 2 and the negative terminal of the direct current source 6.

It is believed that the operation of the corrosion-prevention system is already clear from the above description. The transmitter 8 transmits the direct current which it has received from the positive terminal of the source 6 towards the external surface of the conduit 1. That portion of the current which arrives at the external surface of the conduit cathodically protects the latter and, thereupon, is returned to the negative terminal of the source 6. The amount of current transmitted by the transmitter means 8 is dependent upon the material it is made of. For instance, iron or other ferrous materials consume more current than if the transmitter 8 were made of inert material such as platinum-coated titanium.

That portion of the current which arrives at the cathodic plate means 13 is conducted by means of the low-loss wire 11 to the inert anode 9 and protects the interior surface by means of the impressed current system, as described above.

It is evident that the cathodic plate means 13 are impressed with a positive voltage potential whose magnitude is lower than the voltage existing at the transmitter means 8. In other words, some voltage drop will occur here as well as at other points in the circuit. That is, voltage drops normally occur between the transmitter 8 and the environment 3, between the environment 3 and the cathode plate means 13, between the inert anodes 9 and the corrosive fluids within the conduit 1, and between the corrosive fluids and the inside surface 4 of the conduit 1. A minimal amount of voltage drop, preferably zero volts, occurs between the cathodic plate means 13 and the inert anode 9 since they are connected by the relatively low-loss wire 11.

In practice, the following relative values of voltage drops occur; 3 volts between the transmitter 8 and the environment 3; 2 volts between the environment 3 and the cathodic plate means 13; 0 volts between the cathodic plate means 13 and the inert anodes 9; 2 volts between the inert anodes 9 and the corrosive fluid; 1 volt between the corrosive fluids and the inside surface 4 of the conduit 1. It should be understood that these values are representative only and serve as a basis for comparing the relative voltage drops between the various elements in the electrical current paths.

It will be further understood that the exterior surface 2 of the conduit 1 may be coated with a coating similar to the passive coating 5 applied to the interior surface 4.

Furthermore, in a preferred embodiment of the corrosion-prevention system recited herein, the metallic conduit 1 is preferably made of iron, steel or other ferrous materials. The inert anodes are made of any metallic or non-metallic material which will not react in the presence of the ambient corrosive liquid; one such material is platinum-coated titanium.

One preferred usage of the conduit 1 is to convey sewage waste and discharge it far away from the shore so as to avoid coastal pollutions. In this case, sewage waters having a low conductivity will present a high resistance, i.e. 2.5 ohms-centimeter, to the current flow. Thus, the anodes would have to be closely spaced along the elongation of the conduit in order to achieve adequate corrosion protection.

In order to avoid this, substances, such as chlorides, which are capable of increasing the conductivity of sewage water, are added to the sewage water and serve to considerably reduce the ohmic resistance down to values of 50 ohms - centimeter or lower. This mixing action may be accomplished by using an injection-mixer unit which is located upstream of the insulation joint 16, as shown in FIG. 2. Of course, sea water can be conveniently used to increase the conductivity of the sewage water and will allow the inert anodes 9 to be spaced at greater distances along the conduit 1.

The mixer unit may also be provided with means for aerating the waste by adding oxygen to the sewage so as to aid the de-pollution of the waste material.

Another embodiment especially useful on vessels having coupling pipes would feed each inert anode directly from the single storage battery, or from several batteries each respectively connected with the inert anodes.

It will be further understood that more than one transmitter means 8 may be located along the elongation of the conduit 1 to protect upstream and downstream portions of the conduit where the protective action of the first-mentioned transmitter means 8 is attenuated.

It will be understood that each of the elements described above, or two or more together, may also find a useful application in other types of system differing from the types described above.

While the invention has been illustrated and described as embodied in a corrosion-prevention system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A system for protecting the exterior and the interior surfaces of a metallic conduit from the effects of corrosion, comprising an elongated metallic conduit having an exterior surface in contact with a surrounding corrosively-wet environment and an interior surface in contact with corrosive fluids conveyed within said conduit, both of said surfaces being subject to the effects of corrosion; and combined means for cathodically protecting said exterior and interior surfaces simultaneously, said combined means including means for transmitting electrical current through said corrosively-wet environment and towards said exterior surface for thereby completing a first electrolytic path therewith so as to protect said exterior surface, a plurality of inert anodes mounted at interior locations spaced along the elongation of said conduit, and cathodic plate means electrically connected with said anodes and being located exteriorly of said conduit intermediate said transmitting means and said exterior surface so as to intercept said first electrolytic path and conduct a portion of the current transmitted towards said exterior surface to said inert anodes for thereby completing a second electrolytic path through said corrosive fluids within said conduit so as to protect said interior surface thereof.

2. A system as defined in claim 1, wherein said elongated metallic conduit comprises a plurality of metallic piping sections fixedly connected with each other, said interior and said exterior surfaces being provided with a corrosion-resistant layer having undesired exposed metallic portions.

3. A system as defined in claim 2, wherein said combined means further comprises a source of direct current whose negative terminal is electrically connected with said conduit, and said transmitting means being formed of anodic material which is electrically connected with the positive terminal of said source for completing said first electrolytic path with said corrosively-wet environment serving as the electrolyte.

4. A system as defined in claim 3, wherein said cathodic plate means intercepts the flow of current in said first electrolytic path and completes said second electrolytic path through said exposed metallic portions of the interior surface of said conduit.

5. A system as defined in claim 3, wherein said anodic material of said transmitting means is made of metal material.

6. A system as defined in claim 3, wherein said conduit is formed of ferrous material, and said inert anodes and said transmitter means are formed of platinum-coated titanium.

7. A system as defined in claim 1; and further comprising means for electrically insulating said inert anodes from said metallic conduit.

* * * * *